United States Patent [19]

Milstein

[11] Patent Number: 4,744,034

[45] Date of Patent: May 10, 1988

[54] CONTRACT ESTIMATING SYSTEM UTILIZING A BAR CODE RULER

[75] Inventor: Irving Milstein, Margate, N.J.

[73] Assignee: Judith Titton, Margate, N.J.

[21] Appl. No.: 784,338

[22] Filed: Oct. 4, 1985

[51] Int. Cl.[4] ............... G06F 3/033; G06K 21/06
[52] U.S. Cl. .......................... 364/464; 33/1 G; 33/566; 235/70 A; 235/385; 235/495; 364/403; 364/562; 364/709
[58] Field of Search ............... 364/401, 403, 409, 464, 364/518, 709, 561, 562; 235/383, 385, 462, 472, 484, 70 R, 70 A, 495; 33/1 AA, 1 G, 1 L, 432, 436, 476, 529, 562, 566, 571, 572

[56] References Cited

U.S. PATENT DOCUMENTS

| | | | |
|---|---|---|---|
| 3,238,501 | 3/1966 | Mak et al. | 235/472 |
| 3,859,632 | 1/1975 | Etter | 235/495 |
| 4,095,273 | 6/1978 | Gonzalez | 364/709 |
| 4,255,653 | 3/1981 | Borkat et al. | 235/495 |
| 4,323,773 | 4/1982 | Carpenter | 235/462 |
| 4,337,375 | 6/1982 | Freeman | 235/472 |
| 4,383,298 | 5/1983 | Huff et al. | 364/403 |
| 4,390,778 | 6/1983 | Toivonen | 235/70 R |
| 4,481,412 | 11/1984 | Fields | 235/462 |
| 4,521,678 | 6/1985 | Winter | 235/472 |
| 4,569,421 | 2/1986 | Sandstedt | 364/401 |
| 4,656,591 | 4/1987 | Goldberg | 364/403 |

Primary Examiner—Parshotam S. Lall
Assistant Examiner—Kevin J. Teska
Attorney, Agent, or Firm—Norman E. Lehrer

[57] ABSTRACT

A bar code ruler is divided into a plurality of equally spaced increments each of which is marked by a machine readable bar code number. The ruler includes a plurality of recesses along the length thereof which cooperate with a spring biased ball carried by a slide member, the ball and recesses functioning as a detent to temporarily maintain the slide member in any desired position on the ruler. A hand held bar code reader is used to scan the bar code number on the ruler next to the slide with the edge of the slide functioning as a guide. A menu is also provided which includes a plurality of bar codes representing different component parts and sizes and a plurality of scale factors. The bar code reader can read the codes on the menu and on the ruler and feeds the information to a computer which counts the number of each size component part and which calculates the total length of pipes and similar components measured by the ruler.

9 Claims, 2 Drawing Sheets

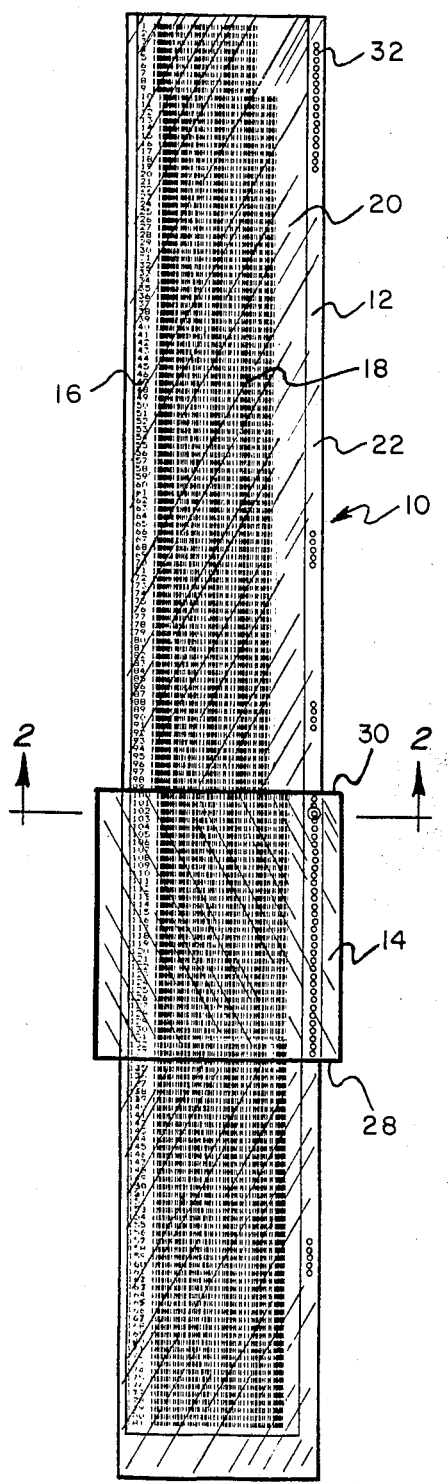
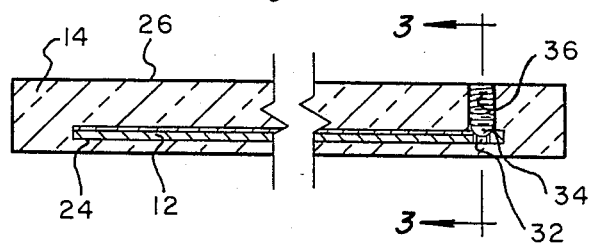
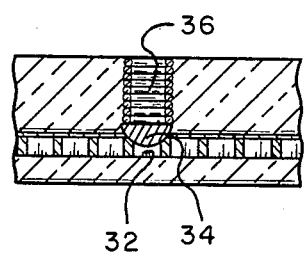
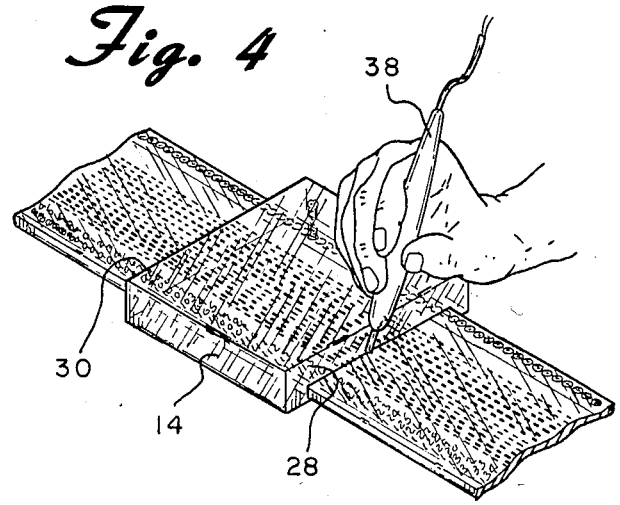

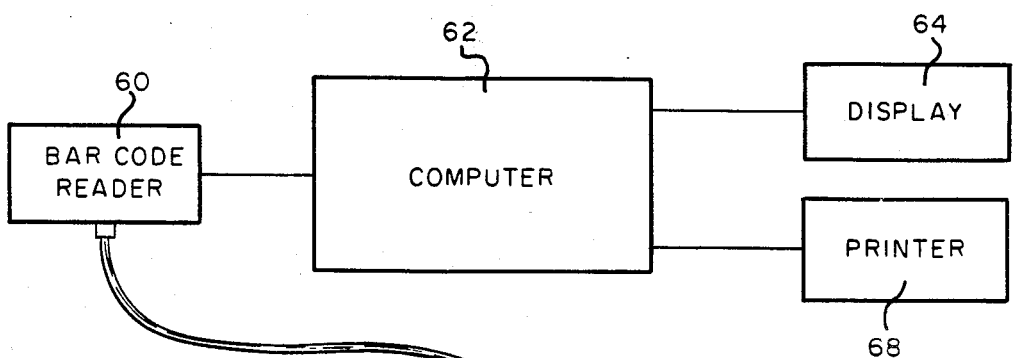

CONTRACT ESTIMATING SYSTEM UTILIZING A BAR CODE RULER

BACKGROUND OF THE INVENTION

The present invention is directed toward a contract estimating system and more particularly toward such a system which utilizes a bar code ruler and a bar code reader for measuring and counting the various construction components and a computer for accumulating the information.

In the building construction trades there is the necessity to provide accurate estimates of the cost of construction for use in competitive bidding. An accurate cost estimate must take into account the costs of a vast multitude of structural, plumbing, electrical, heating and other types of purchased equipment and components. Preparing accurate estimates has, in the past, been a time consuming and expensive task. This difficulty has been aggravated in recent years by the manyfold increase in the types and sizes of equipment used in modern construction and by rapidly changing prices.

Computers have been utilized in recent years to store and process the voluminous data required in the preparation of cost estimates. Such computers can easily store the pertinent data concerning the wide range of equipment from manufacturers catalogues and provide ready access to the information on demand. Furthermore, the mathematical operations required in producing a tabulation of all of the equipment for a large construction job together with any desired cost breakdown of the materials can easily be performed by the computer.

Nevertheless, human operators are required to load the data from the architects' drawings into the computer so that it may produce the desired cost estimate. The estimator must work from blueprints or drawings and insert quantity data for each type of equipment or component involved. For example, the operator, through the use of a keyboard, or the like, manually inserts data relating to the number of feet of electrical conduit, the number of feet of pipe or the total number of pipe fittings of any given type and size, etc. In determining the number of feet of conduit or pipe or the like, the estimator normally utilizes a ruler to measure the component on the architect's drawing and feed this measurement into the computer which, utilizing a scale factor, converts this measurement into the proper number of feet. The scale factor is selected by the estimator based on the drawing scale factor and is programmed into the computer.

Devices have been proposed in the past for assisting an estimator in measuring the length of conduit or pipe or the like on a drawing. These devices utilize a hand held probe which includes a small wheel mounted at the lower end thereof. The wheel is rolled along the length of line on the drawing and an electrical signal is generated which is dependent on the number of rotations of the wheel and which, therefore, represents the length of the line. This electrical signal can be fed into a calculator or computer which can be used to assist the estimator in accumulating the data and preparing a bid. Examples of such devices are shown in U.S. Pat. Nos. 3,497,959, 4,009,339 and 4,383,301.

While such devices may be of some benefit to the estimator, they fall short of being significant help. Initially, it is noted that such devices rely on friction between the wheel or roller and the drawing. If there is any slippage, an inaccurate measurement will be made. Thus, the estimator must work relatively slowly to insure that the device is making proper contact with the drawing at all time. Furthermore, such devices can only be utilized to measure lengths of pipe or conduit or the like. They cannot be utilized to count the number of pipe fittings and numerous other components used in construction. While other input devices such as keyboards or other types of buttons can be utilized to input data relating to these various other types of components and data relating to scale factors and component sizes and the like, this greatly increases the cost and complexity of such a system thereby making it more difficult and costly for an estimator to utilize. Also when keyboard entries are made, the chance of human error is more likely.

SUMMARY OF THE INVENTION

The present invention is designed to overcome all of the problems of the prior art described above. It utilizes a single hand held probe which can easily and quickly feed all of the necessary information to the computer so that the computer can store and process all of the necessary data to prepare a cost estimate. According to the invention, a bar code ruler is divided into a plurality of equally spaced increments each of which is marked by a machine readable bar code number. The ruler includes a plurality of recesses along the length thereof which cooperate with a spring biased ball carried by a slide member, the ball and recesses functioning as a detent to temporarily maintain the slide member in any desired position on the ruler. A hand held bar coded reader is used to scan the bar code number of the ruler next to the slide with the edge of the slide functioning as a guide. A menu is also provided which includes a plurality of bar codes representing different component parts and sizes and a plurality of scale factors. The bar code reader can read the codes on the menu and on the ruler and feeds the information to a computer which counts the number of each size component part and which calculates the total length of pipes and similar components measured by the ruler.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

FIG. 1 is a top plan view of a bar code ruler constructed in accordance with the principles of the present invention;

FIG. 2 is a cross-sectional view taken through the line 2—2 of FIG. 1;

FIG. 3 is a cross-sectional view taken through the line 3—3 of FIG. 2;

FIG. 4 is a perspective view of a portion of the ruler FIG. 1 showing the manner in which it is utilized;

FIG. 5 is an illustration of a menu useful with the present invention, and

FIG. 6 is a schematic representation shown primarily in block form of an overall contract estimating system utilizing a bar code ruler.

DETAILED DESCRIPTION OF THE PREFERRED EMBODIMENT

Referring now to the drawings in detail wherein like reference numerals have been used throughout the various figures to designate like elements, there is shown in FIG. 1 a bar code ruler constructed in accordance with the principles of the present invention and designated generally as 10. The bar code ruler 10 is comprised essentially of two parts, an elongated substantially thin and flat ruler member 12 and a slide member 14. The ruler member 12 may be of substantially any length but it has been found that a length of about two feet makes the device easily maneuverable and, therefore, easy to use. The length of the ruler member is, of course, substantially longer than its width which may be approximately two to three inches.

The ruler member 12 is divided into a plurality of equally spaced increments much like any ruler utilized to make measurements. However, while these increments may be marked with human readable Arabic numerals as shown at 16, they are also identified by machine readable numbers 18. In the preferred embodiment of the invention, the machine readable numbers are optically readable bar codes. Each bar code identifying a different numbered increment. It must be understood, however, that this is by way of example only, other machine readable indicia can be utilized to identify each increment. Thus, it is not beyond the scope of the present invention to utilize magnetically coded numbers which could be machine read.

The machine readable numbers 18 may be printed or otherwise formed directly on the upper surface of the ruler member 12. Alternatively, and as shown in the figures, the machine readable numbers 18 may be printed on an elongated piece of paper 20 or the like which may be laminated to a clear transparent plastic 22 to form the ruler member 12. In any case, these numbers must be visible from the upper surface of the ruler member. By visible, it is meant that the numbers must be readable from the upper surface. Thus, if the machine readable numbers 18 were magneticly encoded, they would not be optically "visible" from the upper surface but they would be readable.

In the preferred embodiment of the invention shown in FIG. 1, there are approximately 180 machine readable numbers 18 on the ruler member 12. These are spaced at ⅛th inch increments and, therefore, each eight numbers would represent one inch. Again, however, this is by way of example only as the invention would also be useful with other spacings and other total numbers of increments. As will be readily apparent to one skilled in the art, utilizing different spacings on the ruler member 12 would merely require a different scale factor when making measurements.

The slide member 14 carried by the ruler member 12 is comprised essentially of a rectangular block of plastic or similar material. The block has a slotted opening 24 therein through which the ruler member 12 can pass. The opening 24 is slightly larger than the dimensions of the ruler member 12 so that the slide member 14 is relatively easily slidable along at least a substantial length of the ruler member.

The upper surface 26 of the slide member 14 covers a portion of the upper surface of the ruler member 12. However, since the length of the slide member is substantially less than the length of the ruler member 12, the slide member has a leading edge 28 and a following edge 30 which can be arranged adjacent any selected one of the machine readable numbers 18. As shown in FIG. 1, the edge 28 is arranged adjacent the number 134 whereas the edge 30 is adjacent the number 99. It should be readily apparent that either the edge 28 or the edge 30 can be considered the leading edge depending on the direction of movement of the slide member 14.

In order to insure that the edge 28 or edge 30 is properly aligned adjacent one of the machine readable numbers 18, the slide member 14 and ruler member 12 are provided with detent means. These detent means include a plurality of recesses 32 formed along one edge of the ruler member 12. These recesses 32 may, in fact, be holes passing directly through the ruler member. The recesses 32 are spaced ⅛th inch apart from each other and there is one recess for each machine readable number 18.

The slide member 14 carries a cooperating detent member comprised of a ball 34 which is spring biased downwardly by coil spring 36. Thus, as the slide member 14 is moved along the ruler member 12, the ball 34 moves into successive recesses 32 and will temporarily maintain the slide member 14 in any desired position along the length of the ruler member 12 with edge 28 or edge 30 properly aligned adjacent the desired machine readable number 18.

As shown in FIG. 4, the edges 28 and 30 have a substantial height or thickness thereto so that the same can function as a guide for the hand held pen like sensor 38 utilized to read the numbers 18. Because the machine readable numbers 18 are placed at ⅛th inch increments, the thicknesses of these numbers must be very small. Without the use of some kind of guide, it would be difficult for a person to draw the sensor 38 across the width of the ruler to read one of the numbers without crossing over several different numbers. The guide formed by the edge 28 or 30 helps to maintain the sensor 28 in a straight line so that only the desired machine readable number 18 is read.

The bar code ruler 10 described is utilized in the following manner. Similar to any conventional ruler, the bar code ruler 10 is placed on or next to a construction or architect's drawing with the right or upper end, as shown in FIG. 1, adjacent to the beginning of the line representing the pipe or other component whose length is to be measured. The slide 14 is then moved so that edge 28 or 30 is substantially aligned with the remote end of the line representing the length of pipe being measured. Because of the spring biased detent means, the slide 14 will remain in the desired position. The hand held sensor 38 can then be drawn across the machine readable number 18 using the guide formed by the edge 28 or 30 to read the number and to feed that information to a computer which will be described in more detail hereinafter.

FIG. 5 illustrates a simple menu 39 which may be utilized with the present invention. This menu is entitled mechanical and is intended to be used in preparing an estimate of the mechanical systems of a building. It is possible to provide a separate menu for each of the major aspects of a building or, alternatively, all of the menus can be printed on a single sheet of paper or board or compiled into a book form. It is also possible to utilize the upper surface 26 of the slide member 14 to carry a menu and since there is limited space thereon, such a menu would include only the most common information which might be needed.

The menu 39 includes a listing of a variety of various component parts in a first column at the left thereof. By way of example, not limitation, these parts may include elbows, Tee's, flanges, etc. This column has been identified at 40. Column 42 at the center of the menu may list a plurality of different sizes such as ¼", ½", etc. The third column 44 may include a plurality of scale factors such as X2, X3, etc.

Adjacent each word or number on the menu 39 is a bar code symbol representing that word or number. For example, a bar code 46 which is located beneath the word mechanical identifies the menu 39 as being for the mechanical system and as will be seen below is utilized to advise the computer that it is the mechanical system currently being worked on. By way of further example, and in a like manner, bar codes 48, 50 and 52 identify the three columns 40, 42 and 44 and bar codes 54, 56 and 58 identify a pipe, a 2" size and a scale factor of 10, respectively.

The computer system utilized with the present invention is shown diagramatically in FIG. 6. As shown therein, the sensor 38 is connected to a bar code reader circuit 60 which, in a manner well known in the art, works in cooperation with the optical sensor 38 to provide an electrical output signal representing the information read by the sensor 38. This output is fed to the input of a general purpose computer 62. Computer 62 may be substantially any type of general purpose home or business computer. Connected to the computer 62 is a monitor such as a cathode ray tube display 64 so that the estimator utilizing the system can monitor the information being fed into and processed by the computer. A hard copy of the data processed by the computer 62 or the final estimate or breakdowns thereof can be obtained through printer 68.

The contract estimating system of the present invention is utilized in the following manner. If the estimator is first going to prepare an estimate for the mechanical system of the building, he selects the mechanical menu 39. The sensor 38 will be scanned across the bar code 46 to advise the computer 62 that it is the mechanical system being worked on. The estimator may first wish to count all elbow joints of a given size. He selects the size by running the sensor 38 across the bar code 50 on the menu and then across the bar code 56, for example, to select the 2" size. Thereafter, while examining the drawing, the estimator will run the sensor 38 across the bar code 70 identifying an elbow each time he sees a 2" elbow on the drawing. All of this information will be accumulated by the computer 62 and will be displayed on the monitor 64.

When it is desired to measure a total length of pipe or the like, the proper scale factor is selected based on the scale to which the drawing is made. For example, the estimator will scan the bar codes 52 and 58 with the sensor 38 in order to advise the computer that the scale factor is X10. The sensor 38 is then scanned across the bar codes 48 and 54 to signal the computer 62 that a pipe is going to be measured and the 2" size is selected by scanning the bar codes 50 and 56. The computer 62 is now prepared to receive information concerning pipe lengths. At this point, the bar code ruler 10 is utilized in the manner described above. As the sensor 38 is scanned across one of the bar codes 18 representing the length of pipe on the drawing, the computer 62 calculates the actual pipe length utilizing the selected scale factor.

As should be readily apparent to those skilled in the art, the computer 62 may be programmed so that it can accumulate all of the incoming data and perform whatever operations are needed with respect to the same. For example, each time a length of pipe of a particular size is inputted, the computer will add this length to the already accumulated amount to provide a total length of pipe of each size. The cost of each component part by piece and by size can also be stored in the computer and the same can be programmed to calculate the total cost of the equipment utilizing this stored information. The printer 68 can print out all of the final cost breakdowns calculated by the computer.

The present invention may be embodied in other specific forms without departing from the spirit or essential attributes thereof and accordingly reference should be made to the appended claims rather than to the foregoing specification as indicating the scope of the invention.

I claim:

1. A ruler comprising:
   an elongated substantially thin ruler member having a length which is substantially longer than its width;
   at least a substantial length of said ruler member being divided into a plurality of equally spaced increments;
   each of said increments being identified by a different machine readable number visible from the upper surface of said ruler member;
   a slide member carried by said ruler member and covering a portion of the upper surface of said ruler member, said slide member being slidable along at least said substantial length of said ruler member and including a leading edge which is adapted to be arranged adjacent any selected one of said machine readable numbers;
   said leading edge having a substantial enough thickness to act as a guide for a hand held pen like sensor which can be drawn across the width of said ruler member against said edge in order to read the number adjacent to which said edge has been arranged.

2. The invention as claimed in claim 1 wherein said machine readable numbers are comprised of bar codes.

3. The invention as claimed in claim 1 further including detent means between said slide member and said ruler member for temporarily maintaining said slide member in any desired position along the length of said ruler member.

4. The invention as claimed in claim 3 wherein said detent means include a plurality of recesses formed in the surface of said ruler member along the length thereof and a spring biased member carried by said slide member and cooperating with one of said recesses.

5. A contract estimating system comprising:
   an elongated substantially thin ruler having a length which is substantially longer than its width;
   at least a substantial portion of said ruler being divided into a plurality of equally spaced increments;
   each of said increments being identified by a different machine readable number visible from the upper surface of said ruler;
   a slide member carried by said ruler and covering a portion of the upper surface of said ruler, said slide member being slidable along at least said substantial length of said ruler and including a leading edge which is adapted to be arranged adjacent any selected one of said machine readable numbers;
   said leading edge having a substantial enough thickness to act as a guide;
   a menu having a plurality of machine readable codes thereon, some of said codes representing different types of materials or construction components and some of said codes representing different sizes of components;
   a hand held pen like sensor adapted to be drawn across said menu codes for reading the same, said sensor also being adapted to be drawn across the width of said ruler against said guide edge for reading the number adjacent to which said edge has been arranged;

computer means having an input connected to said sensor, said computer means being capable of identifying a signal received from said sensor as a component identification, a component size or a length and said computer means further including means for separately accumulating information concerning each type and size component, and means for displaying the information accumulated by said computer.

6. The invention as claimed in claim 5 wherein said menu also includes a plurality of codes representing scale factors and wherein said computer adjusts all numbers read from said ruler by the scale factor selected by said sensor.

7. The invention as claimed in claim 5 wherein said machine readable numbers and said codes are comprised of bar codes and wherein said sensor is a bar code reader.

8. The invention as claimed in claim 5 further including detent means between said slide member and said ruler for temporarily maintaining said slide member in any desired position along the length of said ruler.

9. The invention as claimed in claim 8 wherein said detent means includes a plurality of recesses formed in the surface of said ruler along the length thereof and a spring biased member carried by said slide member and cooperating with one of said recesses.

* * * * *